United States Patent [19]
Tabita

[11] 3,795,999
[45] Mar. 12, 1974

[54] INSECTICIDAL INCENSE AND METHOD FOR THE MANUFACTURE THEREOF

[76] Inventor: Yoshikatsu Tabita, No. 545, 2-chome, Higashi-Uenoshiba-cho, Sakai-shi, Osaka-fu, Japan

[22] Filed: June 13, 1972

[21] Appl. No.: 262,333

Related U.S. Application Data
[63] Continuation-in-part of Ser. No. 837,185, June 27, 1969, abandoned.

[52] U.S. Cl. .................................. 43/127, 43/144
[51] Int. Cl. ............................................. A01m 13/00
[58] Field of Search ............ 43/127, 124, 131, 144; 21/111, 116; 424/40, 42

[56] References Cited
UNITED STATES PATENTS

| | | | |
|---|---|---|---|
| 2,765,579 | 10/1956 | Gordon | 43/127 |
| 2,682,461 | 6/1954 | Hutchison | 424/40 X |
| 2,440,082 | 4/1948 | Flanders et al. | 424/42 |
| 2,606,858 | 8/1952 | Gillies et al. | 424/40 |
| 2,633,444 | 3/1953 | Marke | 424/40 |
| 2,700,011 | 1/1955 | Taylor | 424/40 |
| 3,248,287 | 4/1966 | Sonbert | 424/40 |

Primary Examiner—Hugh R. Chamblee
Attorney, Agent, or Firm—Wenderoth, Lind & Ponack

[57] ABSTRACT

An insecticidal incense device. The device has a semi-non-flammable sheet member having a body of fumous burnable material coated and adhered thereon in a continuous line. The fumous burnable material has a fumous insecticidal material therein. When the fumous burnable material is burned, the portion of the sheet member beneath the fumous burnable material supports the combustion of the fumous material while the remainder of the sheet does not burn.

1 Claim, 12 Drawing Figures

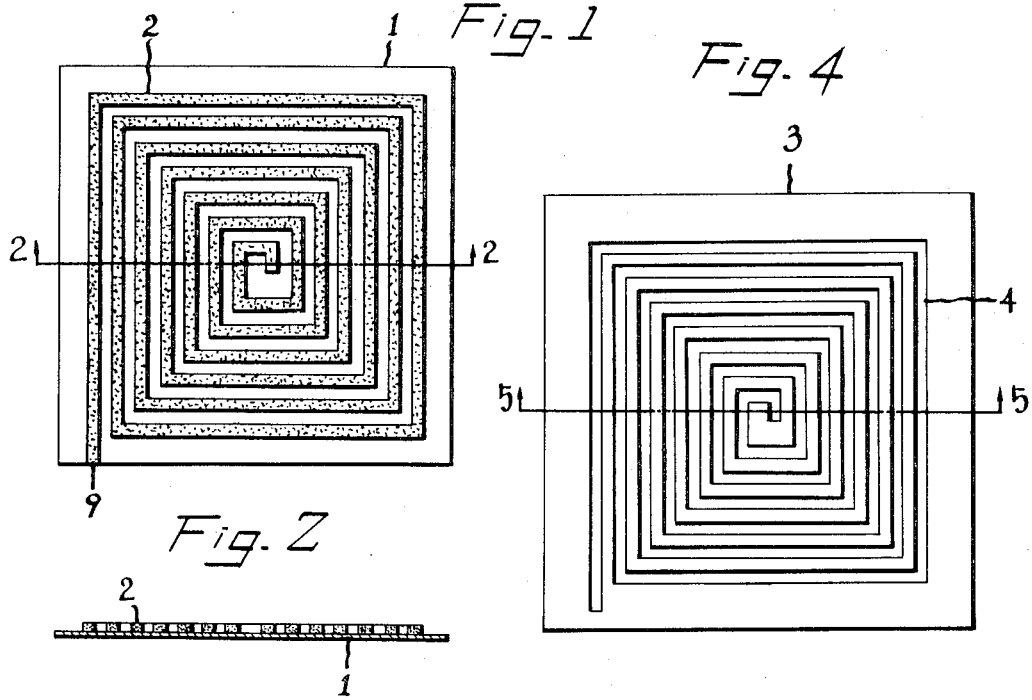
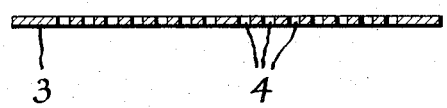
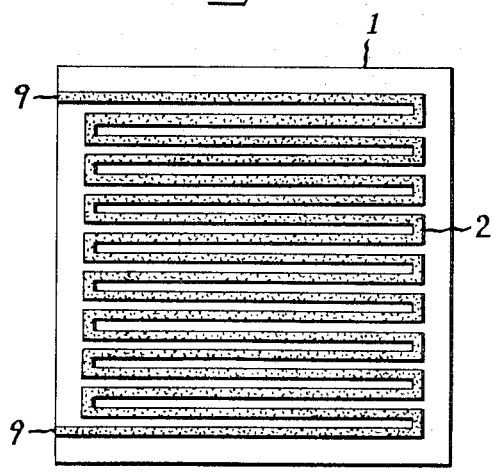

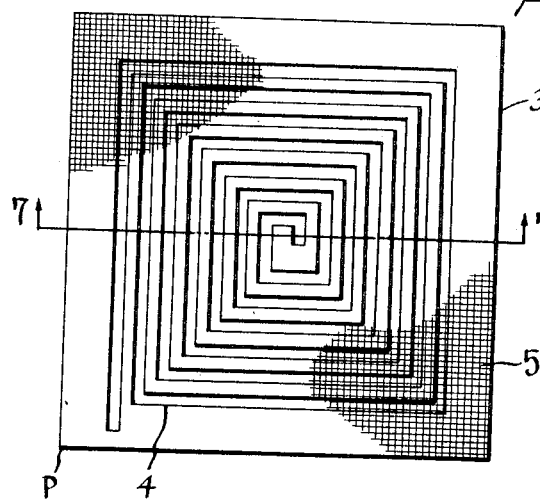
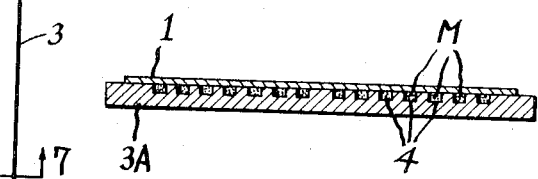
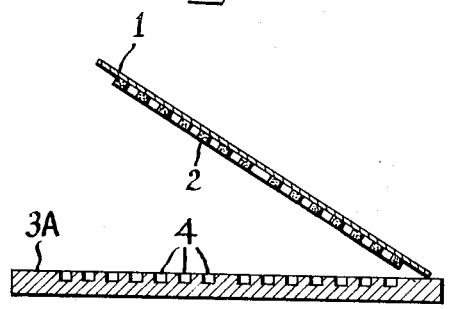
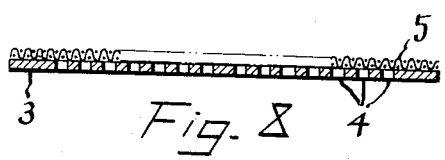
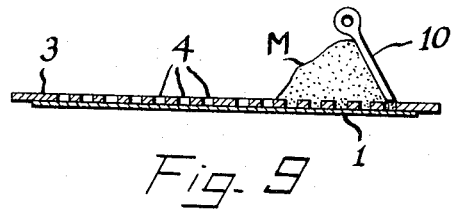
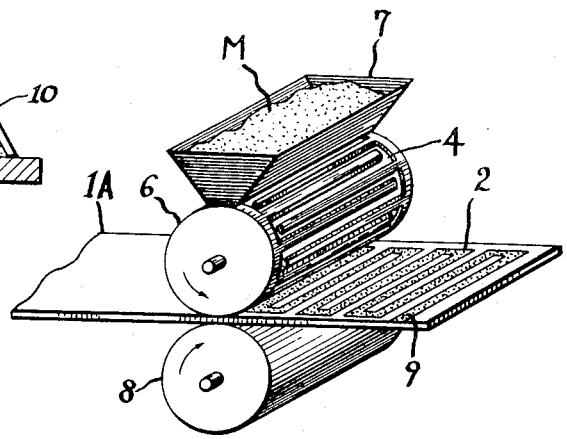

INSECTICIDAL INCENSE AND METHOD FOR THE MANUFACTURE THEREOF

This application is a continuation-in-part of application Ser. No. 837,185, filed June 27, 1969, now abandoned.

This invention relates to a novel insecticidal incense and method for the manufacture thereof. The invention has the advantages that an insecticidal incense with improved strength can be manufactured readily in a simpler manner and at lower cost than heretofore. In the method, fumous material containing insecticidal components which is in the form of slurry is coated on and bound to the surface of a semi-non-flammable sheet member with the aid of a plate mold having a suitable figure formed therein to a suitable depth, and thereafter the article thus formed is dried for a short period to furnish said insecticidal incense.

In order that the invention may be clearly understood and readily carried into effect, it will now be fully described with reference to the accompanying drawings, in which:

FIG. 1 is a plan view of one embodiment of an insecticidal incense according to the invention;

FIG. 2 is a sectional view taken along the line 2—2 in the preceding figure;

FIG. 3 is a plan view of another embodiment of an insecticidal incense according to the invention;

FIG. 4 is a plan view of a plate mold having a square-coiled groove in which slurry applied to form said incense is embedded;

FIG. 5 is a sectional view taken along the line 5—5 in the preceding figure;

FIG. 6 is a plan view of another embodiment of a plate mold similar to the plate mold as shown in FIG. 4;

FIG. 7 is a sectional view taken along the line 7—7 in the preceding figure;

FIG. 8 is a cross-sectional view showing a method of the invention for placing the slurry in the groove provided in the plate mold;

FIGS. 9-11 are diagrammatic views, in cross-section, showing in consecutive order the successive stages of the method for manufacturing the insecticial incense by another method of the invention; and FIG. 12 is an angular perspective showing a further method according to the invention.

In these drawings, it should be understood that FIGS. 4 to 12 particularly concern the method for the manufacture of the insecticidal incense.

This invention relates to an insecticidal incense and method for the manufacture of said incense wherein fumous material containing insecticidal components is coated on and bound to the surface of a semi-non-flammable sheet member with the aid of a plate mold having a suitable figure formed therein to a suitable depth.

A conventional method for manufacturing the same comprises the steps of mixing powdery vegetable substances containing insecticidal components such as pyrethrin with adhesive to prepare the compound in the form of slurry with cold or hot water, extruding by a suitable means the slurry compound in the form of a spiral stick, or extruding the same in the form of a band and punching said band to yield the spiral stick, and drying. According to the conventional method, in order to prevent the insecticidal incense from falling to pieces during the manufacturing process, it has been found necessary to strengthen it and increase its diameter. The incense according to the conventional method requires in its manufacturing process a long time to completely dry, and, since relatively large quantities of powdery vegetable substances are employed therein, the fumes thereof considerably increase when it is burned. In the case where the incense is continuously utilized in a small room, such a large amount of the fumes may prove to be disagreeable to the eyes and throat. On the other hand, a fine incense is hard to manufacture, and if it is manufactured, the finished article is often found to be fragile.

The present inventor has succeeded by research in developing and manufacturing the novel insecticidal incense having good effects, eliminating the above-mentioned disadvantages.

An object of the invention is to provide a method for manufacturing insecticidal incense which is effective to increase the production efficiency by reducing the drying time required.

Another object of the invention is to provide a novel insecticidal incense effective to decrease discomfort by reducing the amount of fumes given off therefrom.

Another object of the invention is to provide a novel insecticidal incense with light weight and reduced bulk.

A further object of the invention is to provide such an incense which does not become useless by falling to pieces.

A still further object of the invention is to provide such an incense wherein even if cracks generate in the fumous body, it will continue to fumigate.

A still further object of the invention is to provide such an incense which can be easily burned in a simple manner.

A particular object of the invention is to provide such an incense which can be manufactured in a simpler manner and at lower cost than heretofore.

Another particular object of the invention is to provide such an incense which, inasmuch as the fumous body of said incense can be continuously produced, can be manufactured in the shape of any suitable figure, for example, an animal, a flower or an arbitrary figure.

The insecticidal incense of this invention is comprised of a semi-non-flammable sheet member having a suitable thickness and provided on its surface with a fumous body containing thermogasifiable insecticides such as pyrethrin or BHC.

The semi-non-flammable sheet member 1 employed in this invention has properties such that, although said sheet member itself can be singed, only the part thereof beneath the fumous body 2 coated on and bound to the sheet singes as said fumous body 2 burns and the rest of sheet 1 does not catch fire.

By way of example, a paper-like member prepared with pulp mixed with non-flammable material such as asbestos or glass fibre, or paper, cloth, viscous paper, and/or nonwoven cloth including vegetable fibre as its main component, or otherwise suitable material having the aforementioned properties can be employed as said semi-non-flammable sheet member for this invention.

Further, said thermo-gasifiable insecticidal component may include pyrethroidal chemicals such as synthetic or natural pyrethrin as well as $\gamma$-BHC or DDVP, each of which achieves its full effect when it is gasified by heating. Only one of these agents as well as mixtures thereof can be used. Vegetable fumous material such as charcoal powder, wood powder, powdery draff prepared by squeezing vermifuge chyrsanthemum, and so on, and adhesives such as CMC, α-starch, and so on can be used as the main components of the fumous body 2, and, if necessary, inorganic substances such as diatomaceous earth and clay can be added for prevention of over heating, prolongation of the fumigating time, and increase of bulk.

The method for the manufacture of the insecticidal incense of this invention has a novel feature wherein slurry prepared with said thermo-gasifiable insecticide, said vegetable fumous material, and adhesive is coated and bound on the surface of said semi-non-flammable sheet member with the aid of a plate mold or the like of suitable thickness having a continuous groove in the surface thereof in the form of the desired figure to fix the form of said incense, and thereafter the article thus formed is dried to form said fumous body.

The plate mold 3 employed herein may be made of metal, wood, synthetic resin, or other suitable materials having a suitable thickness and also having a desired grooved figure thereon, as shown in FIG. 4, said groove being indicated by reference numeral 4. Further, instead of said plate mold, as shown in FIG. 4, a plate mold P in the form of a sheet of waterproof paper, fibre aggregated plate, or other suitable materials having a continuous figure on a net 5 of fine metal lines or natural or synthetic fibrous yarn maybe employed.

Slurry M to be used to form the fumous body 2 may be prepared with the thermo-gasifiable insecticide, the vegetable fumous material, and adhesive, all of these being kneaded with water. An inorganic substance and fumigation aid agent can be added to said slurry M.

The prime method of this invention, as shown in FIG. 8, comprises the steps of preparing on the surface of the semi-non-flammable sheet member 1 a plate mold having thereon a continuous groove in the form of the figure desired, placing a desired amount of slurry M on the surface of said plate mold 3, spreading said slurry M over the surface by means of a rubber spatula 10 so as to fill the groove forming the FIG. 4, and removing said plate mold 3 and drying it. Then the insecticidal incense of this invention can be produced having the fumous body 2 formed with said slurry M on said sheet member 1, as shown in FIG. 1.

The second method of this invention comprises the same steps as in said prime method, except that the plate mold employed in said method is replaced by the plate mold P prepared with the net 5 bound together with the plate mold 3 having a groove in the shape of a continuous figure, as shown in FIG. 6.

The third method of this invention comprises, as shown in FIGS. 9–11, the steps of preparing a plate mold 3A having a continuous sculptured FIG. 4 having a suitable depth, preparing a desired amount of said slurry M on the surface of said plate mold 3A, spreading said slurry over the surface by means of a rubber spatula 10 so as to fill said sculptured FIG. 4 therewith, and thereafter removing the excess of said slurry from said surface of the plate mold 3A at the same time, placing and pressing the semi-non-flammable sheet member 1 against said surface so as to bind said sheet member with said slurry, separating said sheet member bound together with the fumous body 2 and drying it to furnish the insecticidal incense shown in FIG. 1.

The fourth method of this invention, as shown in FIG. 12, may employ driven rollers, one of which has a groove in the shape of a continuous FIG. 4 on its peripheral surface and is provided wih a hopper 7 above said roller 6, and the second of which is a delivery roller 8 and comprises the steps of providing the slurry M in said hopper 7 effective to supply said slurry to said groove forming the FIG. 4 and to remove the excess, if any, of the slurry from the peripheral surface while the semi-non-flammable sheet member 1 is fed between said rollers 6 and 8 rotating in the opposite directions to each other, transferring the fumous body 2 to a band 1A of said sheet member, and binding them together while said band 1A moves through the spacing between said rollers 6 and 8, and drying it to furnish the insecticidal incense.

In this method, said band 1A of semi-non-flammable sheet member may be a broad-band having a predetermined width and wound on a spool or the like, and a length of said band 1A may be cut for each fumous body 2 and thereby be dired, or said band may be dried and then pieces cut off to produce single elements, as shown in FIG. 3.

The semi-non-flammable sheet member employed in this invention has properties such that, although said sheet member itself can be singed, only the part thereof beneath the fumous body 2 coated on and bound to the sheet singes as said fumous body 2 burns. In other words, said part acts as fuel for the fumous body 2 to keep it burning, and the rest of the sheet does not catch fire. Therefore, this invention has an advantage that the thickness and volume of the fumous body 2 to be coated on and bound to the surface of the sheet member 1 can be considerably reduced. Further, the thickness of said sheet member need only be sufficient to support the fumous body 2 so that a comparatively thin sheet member can be employed herein. Reduction in the thickness and volume of the fumous body 2 results in the reduction of the drying time required, and further in the improvement of the production efficiency.

Since the insecticidal incense of this invention is designed so that only the fumous body 2 and the part of the sheet member beneath said fumous body burns to fumigate and also the volume of these parts are considerably reduced as compared to the prior art, the amount of the fumes of the vegetable substances is accordingly reduced, and the fumes rising while it fumes continuously in the room do not hurt the eyes and throat.

Considerable reduction in the thickness and volume of the fumous body 2 in the thickness of the sheet member 1 results in the production of light incense with small bulk so that it can be easily transported and stored. Furthermore, the point 9 where fire is set with a match or the like is formed thin with small bulk and the fumous body can be readily ignited.

In the insecticidal incense thus manufactured in accordance with this invention, since the fumous body 2 is supported by the sheet member with which said body is bound together, the body does not become useless, even if it cracks and the fire will rarely die out in the course of use thereof, while the conventional incense is apt to become useless once it cracks or snaps.

The increase of this invention can be originally manufactured in a primitive manner in which the slurry adapted to form the fumous body 2 is coated on the surface of the semi-non-flammable sheet member 1 and dried. However, according to the method of this invention, the insecticidal incense can be easily and readily manufactured with the aid of the plate mold 3 having a continuous figure for the fumous body 2, as shown in FIG. 4, or the screen mold P prepared with the net 5 bound together with the plate 3 having a continuous figure for the same as shown in FIG. 6.

The conventional method for the same purpose in general comprises a double step process, the first step of which is to extrude the flurry in the form of an elongated rod or in the form of a band, and the second is to spirally form or punch the rod or band in a suitable figure.

On the contrary, in the method of this invention, as previously described, only a single step process is needed to form the slurry in a desired figure with the aid of the plate mold disclosed in the preceding paragraphs. By reduction in the number of forming steps, simplification in making ans shortening of the drying time for the thin fumous body coating, the method of this invention can be used to manufacture the insecticidal incense extremely economically in an easy way.

Furthermore, the plate mold 3A shown in FIG. 9 or driven roller 6 shown in FIG. 12, both having a continuous groove forming the figure, can be employed for more easy and ready production of the insecticidal incense of this invention. The method wherein said plate mold 3A, shown in FIG. 9, or said roller 6 is employed, is characterized in that removing the excess of the slurry from the surface thereof can be carried out at the same time resulting in a ready formation of the fumous body 2 by transferring said slurry to the sheet member so that this method is particularly suitable for the manufacture of the incense of small thickness. More particularly, the method wherein the roller means 6 is employed may impart improvement in the production efficiency.

Although certain embodiments of this invention have been herein disclosed for the purpose of explanation, various further modifications thereof will be apparent to those skilled in the art. By way of example, inasmuch as a figure arranged on the mold 3,3A, or the roller 6 in the form of a continuous groove or an interrupted groove is continuous, any desired figures such as a flower, an animal, or other arbitrary figure may be arranged to provide a beautifully designed insecticidal incense. Accordingly, it is not desired that this invention be restricted to the embodiments and examples hereinafter described, other than is required by the scope of the appended claims.

EXAMPLE I

| COMPOSITION OF THE SHEET MEMBER | TYPE A | B | C |
|---|---|---|---|
| | (% By Weight) | | |
| Asbestos Fibre | 0 | 20 | 0 |
| Semi-Kraft Pulp | 30 | 50 | 100 |
| Unbleached Kraft Pulp | 40 | 30 | 0 |
| Lintered Pulp | 30 | 0 | 0 |
| CMC | slightly | 0 | 0 |

Said sheet member of 0.4 to 0.6 mm in thickness consisting of the above-mentioned components is most suitably employed. Said sheet member was made with a density of $170g/m^2$ to $240g/m^2$. A content of asbestos of not more than 80 percent by weight based on the weight of the total composition of said sheet member may be permitted for this invention.

EXAMPLE II

| COMPOSITION OF THE FUMOUS BODY | % By Weight |
|---|---|
| Synthetic Pyrethrin | 3.5 |
| Powdery Draff of Vermifuge Chrysanthemum | 30 |
| Charcoal Powder | 40 |
| Wood Powder | 16.5 |
| α-Starch | 10 |
| Water (Cold or Hot) | 250 |

These components are mixed with water to prepare the slurry M.

EXAMPLE III (1) The slurry M was coated and bound to a sheet member 0.4 mm in thickness and 15cm × 15cm in area, the composition thereof being according to Type A to prepare the fumous body 2. To fix the form of the fumous body 2, a plate mold 3 having the FIG. 4 (groove depth 0.6 mm; groove width 3mm; groove-to-groove interval 2mm; and groove length 3.8m) was employed. The fumous body thus formed was dried with hot air at 60° C. for 3 to 5 minutes. Application of the ordinary temperature (20° C – 30° C) on a fine day may be permitted. However, it requires up to 10 hours to completely dry.

WEIGHT OF THE INCENSE THUS FORMED

| | |
|---|---|
| Fumous Body After Drying | 3g (slurry used: 10.5g) |
| Sheet Member | 4g |
| Total Weight | 7g |

(2) The same method as in (1), except for the composition of the sheet member employed herein being according to Type B 0.4 mm in thickness and 15cm × 15cm in area, and the screen plate mold P, as shown in FIG. 6, being employed.

EXAMPLE III (Continued)

(3) The slurry M was placed in the groove of the plate mold 3A, the groove being 0.6 mm in depth, 3mm in width, 2mm between groove portions, and 3.8m in length, to form the fumous body 2 and then covered and bound with the sheet member 0.4mm in thickness and 15cm × 15cm in area. The fumous body 2 was transferred to the sheet member and was dried with hot air at 60° C for 3 to 5 minutes. The composition of the sheet member was employed according to Type A.

(4) As shown in FIG. 12, a roller 6 having a sculptured FIG. 4 on the peripheral surface thereof and a delivery roller 8 were employed. The slurry M filling the sculptured figure was transferred to a band 1A of 0.4mm in thickness, 15cm in width, while said band 1A moved through the spacing between said rollers 6 and 8 rotating in opposite directions to each other, whereby said band 1A having the fumous body 2 thereon was cut at intervals of 15cm and was dried with hot air at 60° C for 3 to 5 minutes. Alternatively, said band 1A can be cut to a predetermined length and cut at intervals of 15cm so as to expose each fumous body on each band of 15cm × 15cm in area after being dried.

EXAMPLE IV

|  | This invention | | Known method |
| --- | --- | --- | --- |
| (1) Methods | (1) | (2) | (3) |
| (2) Composition of sheet member | A | B | C Not employed. |
| (3) Composition of the fumous body: | (The same as in II) | | |
| Its width, mm | 3 | 3 | 3  6. |
| It thickenss (after drying) mm | 0.5 | 0.5 | 0.5  4. |
| Its length, mm | 3.8 | 3.8 | 3.8  75. |
| (4) Total weight, g | 7 | 7.1 | 7  13.5. |
| (5) Fumigating hours | (9 hours±30 minutes) | | 7 hours±30 minutes. |
| (6) Drying time required: | | | |
| Under hot air of 60° C | (3 to 5 minutes) | | |
| Under ordinary temperature (20°-30° C.) | (3 to 5 hours) | | 5 to 10 days. |

EXAMPLE V—INSECTICIDAL TEST

| (1) Test method | Continuously fumigated in accordance with Peet Grady Method. |
| --- | --- |
| (2) Subject tested | Culex pipience molestus. |
| (3) Required time for KT 95% | (In minutes) |

|  | 1 m. above the floor | Floor level |
| --- | --- | --- |
| Articles manufactured according to the Method 1 | 44.7 | 59 |
| Article manufactured according to the Method 2 | 44.6 | 59 |
| Article manufactured according to the Method 3 | 44.7 | 59 |
| (C.f. Known article containing 0.6% of pyrethrin) | 44.8 | 59.5 |

What is claimed is:

1. An insecticidal incense device comprising a semi-non-flammable sheet member having at least 20 percent by weight of burnable material therein, and a body of fumous burnable material coated and adhered thereon in a continuous substantially thin line, said fumous burnable material having a fumous insecticidal material therein, whereby when the fumous burnable material is burned, the burnable material in the portion of the sheet member beneath the fumous burnable material supports the combustion of the fumous material even across cracks therein while the remainder of the sheet does not burn.

* * * * *